United States Patent
Tsuji

(10) Patent No.: US 9,222,579 B2
(45) Date of Patent: Dec. 29, 2015

(54) BELT-DRIVE CONTINUOUSLY VARIABLE TRANSMISSION

(75) Inventor: Yoichi Tsuji, Sagamihara (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 513 days.

(21) Appl. No.: 13/414,088

(22) Filed: Mar. 7, 2012

(65) Prior Publication Data

US 2012/0244974 A1    Sep. 27, 2012

(30) Foreign Application Priority Data

Mar. 23, 2011    (JP) .................................. 2011-063630

(51) Int. Cl.
| | |
|---|---|
| F16H 9/18 | (2006.01) |
| F16H 61/662 | (2006.01) |
| F16H 63/06 | (2006.01) |
| F16H 55/56 | (2006.01) |
| F16H 61/14 | (2006.01) |

(52) U.S. Cl.
CPC .......... *F16H 61/66272* (2013.01); *F16H 55/56* (2013.01); *F16H 63/065* (2013.01); *F16H 61/14* (2013.01)

(58) Field of Classification Search
CPC .... F16H 55/56; F16H 61/14; F16H 61/66272
USPC .......................................................... 474/28
See application file for complete search history.

(56) References Cited

U.S. PATENT DOCUMENTS

| | | | | |
|---|---|---|---|---|
| 5,439,419 A | * | 8/1995 | Yamada ........................... | 474/18 |
| 6,015,359 A | * | 1/2000 | Kunii .............................. | 474/18 |
| 8,414,433 B2 | * | 4/2013 | Kadokawa ................ | F16H 9/18 |
| | | | | 474/18 |
| 2001/0044350 A1 | * | 11/2001 | Nishigaya et al. .............. | 474/18 |
| 2002/0142870 A1 | * | 10/2002 | Okano ..................... | F16H 59/38 |
| | | | | 474/28 |
| 2005/0233844 A1 | * | 10/2005 | Kuroda ........................... | 474/28 |
| 2005/0272539 A1 | * | 12/2005 | Kouta ............................. | 474/18 |
| 2007/0142142 A1 | * | 6/2007 | Yamaguchi et al. ............ | 474/28 |

FOREIGN PATENT DOCUMENTS

| | | | | | |
|---|---|---|---|---|---|
| EP | 1167827 A1 | * | 1/2002 | ............. | F16H 55/56 |
| JP | 03-199719 A | | 8/1991 | | |

(Continued)

OTHER PUBLICATIONS

English Machine Translation of JP 2006-132549 A.*

*Primary Examiner* — William E Dondero
*Assistant Examiner* — Diem Tran
(74) *Attorney, Agent, or Firm* — Foley & Lardner LLP

(57) ABSTRACT

A belt-drive continuously variable transmission including a lock mechanism for locking a primary moveable sheave of a primary pulley in a highest transmission ratio position. The lock mechanism includes a fixed side axial groove extending on an outer circumferential surface of a primary fixed sheave shaft, a moveable side axial groove extending on an inner circumferential surface of a primary moveable sheave sleeve, an intervening member disposed between the axial grooves, an axial tapered groove formed as a part of at least one of the axial grooves which is disposed corresponding to a highest transmission ratio, and an intervening member displacement limiting member arranged to limit an amount of displacement of the intervening member relative to the primary fixed sheave shaft along the fixed side axial groove or the moveable side axial groove.

12 Claims, 8 Drawing Sheets

(56) References Cited

FOREIGN PATENT DOCUMENTS

| | | |
|---|---|---|
| JP | 09-072398 A | 3/1997 |
| JP | 2003-194169 A | 7/2003 |
| JP | 2006-132549 A | 5/2006 |
| JP | 2006-170387 A | 6/2006 |
| JP | 2008-051154 A | 3/2008 |
| WO | WO 2012172836 A1 * | 12/2012 |

* cited by examiner

BELT-DRIVE CONTINUOUSLY VARIABLE TRANSMISSION

BACKGROUND OF THE INVENTION

The present invention relates to a belt-drive continuously variable transmission including a primary pulley and a secondary pulley each having a pair of opposed sheave surfaces, and a belt wound on the pairs of opposed sheave surfaces to connect the primary pulley and the secondary pulley with each other.

The belt-drive continuously variable transmission is operative to ensure a necessary belt clamping force by applying a hydraulic pressure to the primary pulley during high speed running and maintain a highest transmission ratio against variation in transmission torque. In this condition, a primary pressure applied to the primary pulley becomes maximum within a transmission unit, and therefore, a line pressure to be regulated on the basis of a pump discharge pressure from an oil pump must be increased to at least the primary pressure. For this reason, during high speed cruising in which the high speed running is maintained for a long period of time, torque for driving the oil pump cannot be reduced. Accordingly, in an engine-equipped vehicle in which the torque for driving the oil pump is obtained from an engine, it is not possible to enhance fuel economy.

In order to solve the above problem, there have been proposed transmission ratio lock mechanisms for a belt-drive continuously variable transmission which is adapted to lock a primary moveable sheave relative to a primary fixed sheave in a position where a predetermined transmission ratio is attained. Japanese Patent Application Unexamined Publication No. 2008-51154 discloses a hydraulically operated transmission ratio lock mechanism that is adapted to lock a primary moveable sheave relative to a primary fixed sheave in a position where a predetermined transmission ratio is attained, by sealing a hydraulic pressure in a primary pressure chamber of the primary pulley. Japanese Patent Application Unexamined Publication No. 2006-170387 discloses a meshing transmission ratio lock mechanism that is adapted to lock a primary moveable sheave relative to a primary fixed sheave in a position where a predetermined transmission ratio is attained, by using meshing engagement of the primary moveable sheave.

SUMMARY OF THE INVENTION

However, the conventional belt-drive continuously variable transmission equipped with the above-described hydraulically operated transmission ratio lock mechanism must be additionally provided with a valve construction for sealing a hydraulic pressure in the primary pressure chamber. Further, the conventional belt-drive continuously variable transmission equipped with the meshing transmission ratio lock mechanism must be additionally provided with a hydraulic motor and a meshing pawl construction for establishing the meshing engagement of the primary moveable sheave. Therefore, even in either the conventional belt-drive continuously variable transmission equipped with the hydraulically operated transmission ratio lock mechanism or the conventional belt-drive continuously variable transmission equipped with the meshing transmission ratio lock mechanism, there exists such a problem that the number of components is increased to thereby cause an increased cost.

The present invention has been made to solve the problem of the conventional arts. An object of the present invention is to provide a belt-drive continuously variable transmission that can perform a transmission ratio lock function without causing an increase in cost, by utilizing a force acting on an existing component and a moveable sheave.

In one aspect of the present invention, there is provided a belt-drive continuously variable transmission including:
  a primary pulley including a primary fixed sheave having a primary fixed sheave shaft and a primary moveable sheave having a primary moveable sheave sleeve, the primary moveable sheave sleeve being fitted onto the primary fixed sheave shaft and slidably moveable relative to the primary fixed sheave shaft in an axial direction of the primary pulley,
  a secondary pulley including a secondary fixed sheave having a secondary fixed sheave shaft and a secondary moveable sheave having a secondary moveable sheave sleeve, the secondary moveable sheave sleeve being fitted onto the secondary fixed sheave shaft and slidably moveable relative to the secondary fixed sheave shaft in an axial direction of the secondary pulley,
  a belt wound on the primary pulley and the secondary pulley to transmit a driving force from a drive source to the primary pulley and the secondary pulley;
  a first fixed side axial groove extending on an outer circumferential surface of the primary fixed sheave shaft in the axial direction of the primary pulley;
  a first moveable side axial groove extending on an inner circumferential surface of the primary moveable sheave sleeve in the axial direction of the primary pulley so as to be opposed to the first fixed side axial groove;
  a first intervening member disposed between the first fixed side axial groove and the first moveable side axial groove, the first intervening member serving to reduce slide resistance that is caused when the primary moveable sheave sleeve makes an axial slide motion in a transmission range between a low transmission ratio and a high transmission ratio,
  a first axial tapered groove formed as a part of at least one of the first fixed side axial groove and the first moveable side axial groove which is disposed corresponding to a highest transmission ratio range, the first axial tapered groove being formed such that a depth defined between the first fixed side axial groove and the first moveable side axial groove is gradually reduced toward a side of a highest transmission ratio, and
  a first intervening member displacement limiting member arranged to limit an amount of displacement of the first intervening member relative to the primary fixed sheave shaft or the primary moveable sheave sleeve along the first fixed side axial groove or the first moveable side axial groove,
  wherein when the primary moveable sheave sleeve is moved toward a lock position in which the primary moveable sheave sleeve is to be locked in a position corresponding to the highest transmission ratio, the first intervening member displacement limiting member serves to input an engagement force produced by a hydraulic thrust acting on the primary moveable sheave to the first intervening member, and
  wherein when the primary moveable sheave sleeve is moved apart from the lock position thereof, the first intervening member displacement limiting member serves to input a disengagement force produced by a belt reaction force acting on the primary moveable sheave to the first intervening member.

EFFECT OF THE INVENTION

When the primary moveable sheave shaft is moved toward the lock position corresponding to the highest transmission ratio, an engagement force produced by the hydraulic thrust acting on the primary moveable sheave is inputted to the primary intervening member through the primary intervening member displacement limiting member. The primary intervening member to which the engagement force is inputted is pushed into and engaged in the axial tapered groove that is tapered such that the depth between the axial grooves is gradually reduced. As a result, a frictional resistance force generated on mutual contact surfaces of the primary intervening member and each of the primary fixed sheave shaft and the primary moveable sheave sleeve is increased. Thus, the primary intervening member serves as a lock member that locks the primary moveable sheave in the lock position corresponding to the highest transmission ratio. On the other hand, when the primary moveable sheave sleeve is moved apart from the lock position, a disengagement force produced by the belt reaction force acting on the primary moveable sheave is inputted to the primary intervening member through the primary intervening member displacement limiting member. As a result, the primary intervening member is disengaged from the axial tapered groove by the disengagement force inputted thereto, so that the primary moveable sheave is unlocked and released from the lock position. Meanwhile, the primary intervening member (for instance, a ball, a roller, etc.) used as the lock member serving to lock the primary moveable sheave relative to the primary fixed sheave is an existing component to reduce slide resistance that is caused when the primary moveable sheave sleeve makes an axial slide motion in a transmission range between a low transmission ratio and a high transmission ratio. With this construction, it is possible to perform a transmission ratio lock function by utilizing the force exerted on the existing component and the primary moveable sheave without causing increase in cost.

DETAILED DESCRIPTION OF THE INVENTION

In the followings, embodiments of the present invention will be described with reference to the accompanying drawings.

Figure 1:
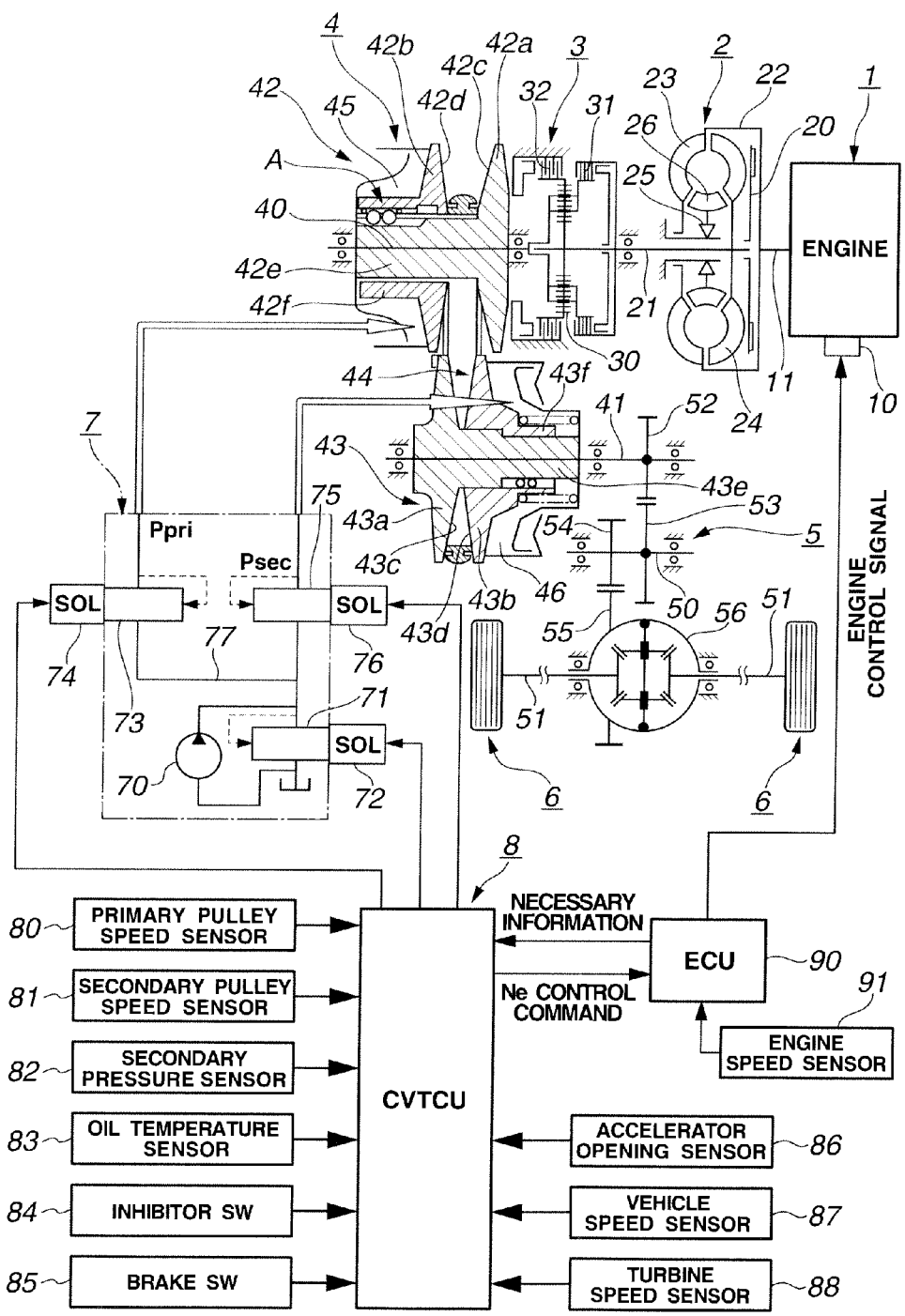
FIG. 1 is a general system diagram showing a drive system and a control system of an engine vehicle equipped with a belt-drive continuously variable transmission according to a first embodiment of the present invention.

FIG. 1 is a general system diagram showing a drive system and a control system of an engine vehicle equipped with a belt-drive continuously variable transmission according to a first embodiment of the present invention. Referring to FIG. 1, a construction of the general system will be explained hereinafter.

As shown in FIG. 1, the drive system of the engine vehicle equipped with the belt-drive continuously variable transmission according to the first embodiment includes engine 1, torque converter 2, forward/reverse changeover mechanism 3, belt-drive continuously variable transmission mechanism 4, final reduction gear mechanism 5 and driving wheels 6, 6.

In engine 1, an output torque can be controlled by an accelerator operation of a vehicle driver, and also an engine speed (i.e., an engine rotation number) and a fuel injection amount can be controlled on the basis of an engine control signal outputted from an external device. Engine 1 includes output torque control actuator 10 that controls the output torque by a throttle valve opening and closing operation and a fuel cut operation.

Torque converter 2 is a fluid transmission device having a torque increasing function. Torque converter 2 includes lockup clutch 20 that can directly couple engine output shaft (i.e., torque converter input shaft) 11 and torque converter output shaft 21 with each other when the torque increasing function is not required. Lockup clutch 20 is brought into hydraulic engagement by a lockup pressure to hold the direct coupling between engine output shaft 11 and torque converter output shaft 21, when lockup is requested. Torque converter 2 also includes turbine runner 23 connected to engine output shaft 11 through converter housing 22, pump impeller 24 connected to torque converter output shaft 21, and stator 26 disposed through one-way clutch 25.

Forward/reverse changeover mechanism 3 serves to make changeover of a direction of rotation inputted to belt-drive continuously variable transmission 4 between a positive direction during forward running and a reverse direction during reverse running. Forward/reverse changeover mechanism 3 includes double-pinion planetary gear set 30, forward clutch 31 and reverse brake 32. Double-pinion planetary gear set 30 includes a sun gear connected to torque converter output shaft 21, and a carrier connected to transmission input shaft 40. Forward clutch 31 is brought into engagement by a clutch pressure during forward running, thereby attaining direct connection between the sun gear of double-pinion planetary gear set 30 and the carrier thereof. Reverse brake 32 is brought into engagement by a brake fluid pressure during reverse running, thereby fixing a ring gear of double-pinion planetary gear set 30 to a transmission case.

Belt-drive continuously variable transmission mechanism 4 includes primary pulley 42, secondary pulley 43 and belt 44. Belt-drive continuously variable transmission mechanism 4 has a continuously variable function of making stepless change of a transmission ratio that is a ratio between input speed (input rotation number) of transmission input shaft 40 and output speed (output rotation number) of transmission output shaft 41 by changing a contact radius of belt 44 contacted with primary pulley 42 and secondary pulley 43.

Primary pulley 42 includes primary fixed sheave 42a and primary moveable sheave 42b. Primary fixed sheave 42a has primary fixed sheave shaft 42e integrally formed with primary fixed sheave 42a. Primary moveable sheave 42b has primary moveable sheave sleeve 42f integrally formed with primary moveable sheave 42b. Primary moveable sheave sleeve 42f is disposed concentrically with primary fixed sheave shaft 42e, and has a hollow cylindrical shape. Primary moveable sheave sleeve 42f is fitted onto primary fixed sheave shaft 42e, and slidably moved relative to primary fixed sheave shaft 42e in an axial direction of primary pulley 42 by primary hydraulic pressure (hereinafter referred to as primary pressure) Ppri introduced into primary pulley hydraulic pressure chamber 45. Primary pulley 42 also includes highest transmission ratio lock mechanism A that serves to lock primary moveable sheave 42b in a specific axial position relative to primary fixed sheave 42a in which a highest transmission ratio is attained.

Secondary pulley 43 includes secondary fixed sheave 43a and secondary moveable sheave 43b. Secondary fixed sheave 43a has secondary fixed sheave shaft 43e integrally formed with secondary fixed sheave 43a. Secondary moveable sheave 43b has secondary moveable sheave sleeve 43f integrally formed with secondary moveable sheave 43b. Secondary moveable sheave sleeve 43f is disposed concentrically with secondary fixed sheave shaft 43e, and has a hollow cylindrical shape. Secondary moveable sheave sleeve 43f is fitted onto secondary fixed sheave shaft 43e, and slidably moved relative to secondary fixed sheave shaft 43e in an axial direction of secondary pulley 43 by secondary hydraulic pressure (hereinafter referred to as secondary pressure) Psec introduced into secondary pulley hydraulic pressure chamber 46.

Belt 44 is wound on primary pulley 42 and secondary pulley 43 to transmit a driving force from engine 1 to primary pulley 42 and secondary pulley 43. Specifically, belt 44 is wound on primary sheave surfaces 42c, 42d of primary fixed sheave 42a and primary moveable sheave 42b which are opposed to each other in the axial direction of primary pulley 42 to form a V-shaped groove therebetween, and secondary sheave surfaces 43c, 42d of secondary fixed sheave 43a and secondary moveable sheave 43b which are opposed to each other in the axial direction of secondary pulley 43 to form a V-shaped groove therebetween. Belt 44 includes two pairs of stacked rings each including multiple rings stacked on one another in a radial direction thereof, and multiple elements that are stamped plates sandwiched between the two pairs of stacked rings and connected and contacted with each other to form a loop shape.

Final reduction gear mechanism 5 serves to reduce transmission output rotation transmitted from transmission output shaft 41 of belt-drive continuously variable transmission mechanism 4 and transmit the transmission output rotation to left and right drive wheels 6, 6 with a differential function. Final reduction gear mechanism 5 includes first gear 52, second gear 53, third gear 54 and fourth gear 55 with a reduction function and differential gear 56 with a differential function which are disposed between transmission output shaft 41, idler shaft 50 and left and right drive axles 51, 51.

As shown in FIG. 1, the control system of the engine vehicle equipped with the belt-drive continuously variable transmission according to the first embodiment includes transmission hydraulic control unit 7 as a hydraulic control unit of a primary pressure and secondary pressure-regulating type, and CVT control unit (CVTCU) 8 as an electronic control unit.

Transmission hydraulic control unit 7 serves to produce primary pressure Ppri that is introduced into primary pulley hydraulic pressure chamber 45, and secondary pressure Psec that is introduced into secondary pulley hydraulic pressure chamber 46. Transmission hydraulic control unit 7 includes oil pump 70, pressure regulator valve 71, line pressure solenoid 72, first pressure reducing valve 73, first solenoid 74, second pressure reducing valve 75 and second solenoid 76.

Pressure regulator valve 71 serves to regulate line pressure PL on the basis of a discharge pressure as an original pressure which is discharged from oil pump 70. Pressure regulator valve 71 has line pressure solenoid 72, and serves to regulate a pressure of a pressurized oil fed from oil pump 70, to line pressure PL having a predetermined value in accordance with a command outputted from CVTCU 8 and then introduce line pressure PL to line pressure passage 77. Oil pump 70 is driven by engine drive torque transmitted through torque converter output shaft 21.

First pressure reducing valve 73 is a normally high spool valve that serves to regulate primary pressure Ppri to be introduced into primary pulley hydraulic pressure chamber 45 by pressure reducing control on the basis of line pressure PL as an original pressure which is produced by pressure regulator valve 71. First pressure reducing valve 73 includes first solenoid 74 that is actuated by a current command outputted from CVTCU 8.

Second pressure reducing valve 75 is a normally high spool valve that serves to regulate secondary pressure Psec to be introduced into secondary pulley hydraulic pressure chamber 46 by pressure reducing control on the basis of line pressure PL as an original pressure which is produced by pressure regulator valve 71. Second pressure reducing valve 75 includes second solenoid 76 that is actuated by a current command outputted from CVTCU 8.

CVTCU 8 executes transmission ratio control, line pressure control, forward/reverse changeover control, lockup control, and the like. CVTCU 8 receives information from sensors and switches such as primary pulley speed sensor 80, secondary pulley speed sensor 81, secondary hydraulic pressure sensor 82, oil temperature sensor 83, inhibitor switch 84, brake switch 85, accelerator opening sensor 86, vehicle speed sensor 87, and turbine speed sensor 88. CVTCU 8 also receives necessary information such as engine speed information obtained by engine speed sensor 91 from engine control unit (ECU) 90, and outputs an engine speed control command, a fuel cut command, a fuel cut recover command and the like to ECU 90. The transmission ratio control, the line pressure control, the forward/reverse changeover control, the lockup control which are executed in CVTCU 8 will be schematically explained hereinafter.

In the transmission ratio control, primary pressure Ppri to be applied to primary pulley hydraulic pressure chamber 45 and secondary pressure Psec to be applied to secondary pulley hydraulic pressure chamber 46 are set in order to attain a target transmission ratio that is determined in accordance with a transmission input speed, an accelerator opening, etc. Further, current commands that are provided to obtain the primary pressure Pri set and the secondary pressure Psec set, respectively, are outputted to first solenoid 74 and second solenoid 76, respectively.

In the line pressure control, a maximum hydraulic pressure among necessary hydraulic pressures in the respective hydraulic elements (i.e., lockup clutch 20, forward clutch 31, reverse brake 32, primary pulley 42, secondary pulley 43) of the belt-drive continuously variable transmission is set as a target line pressure. Further, a current command that is provided to obtain the target line pressure set is outputted to line pressure solenoid 72.

In the forward/reverse changeover control, changeover between engagement and disengagement of forward clutch 31 and reverse brake 32 are performed in accordance with a drive range position selected. In the lockup control, changeover between engagement and disengagement of lockup clutch 20 is performed in accordance with judgment as to whether or not a running condition lies within a lockup range.

Figure 2:
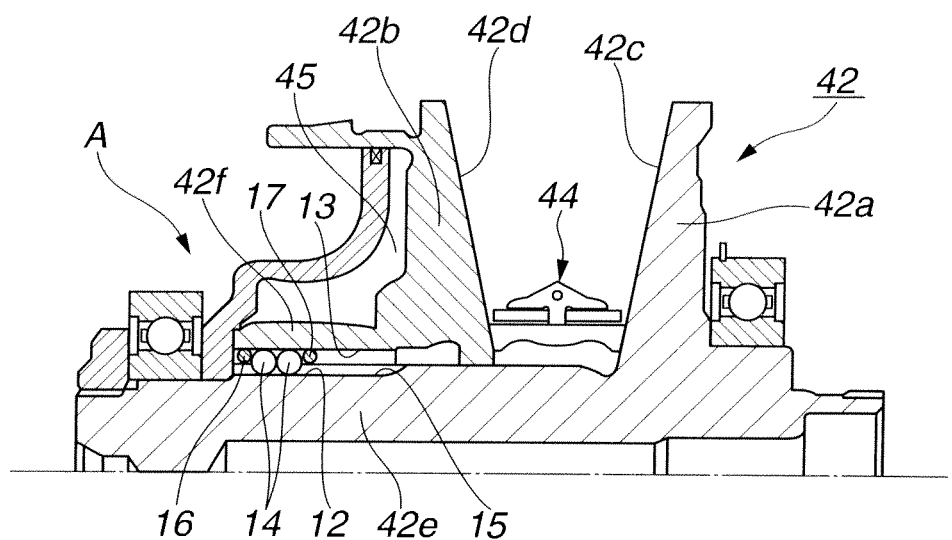
FIG. 2 is a sectional view of a highest transmission ratio lock mechanism used in a primary pulley of the belt-drive continuously variable transmission according to the first embodiment of the present invention, showing a lowest transmission ratio condition of the highest transmission ratio lock mechanism.
Figure 3:
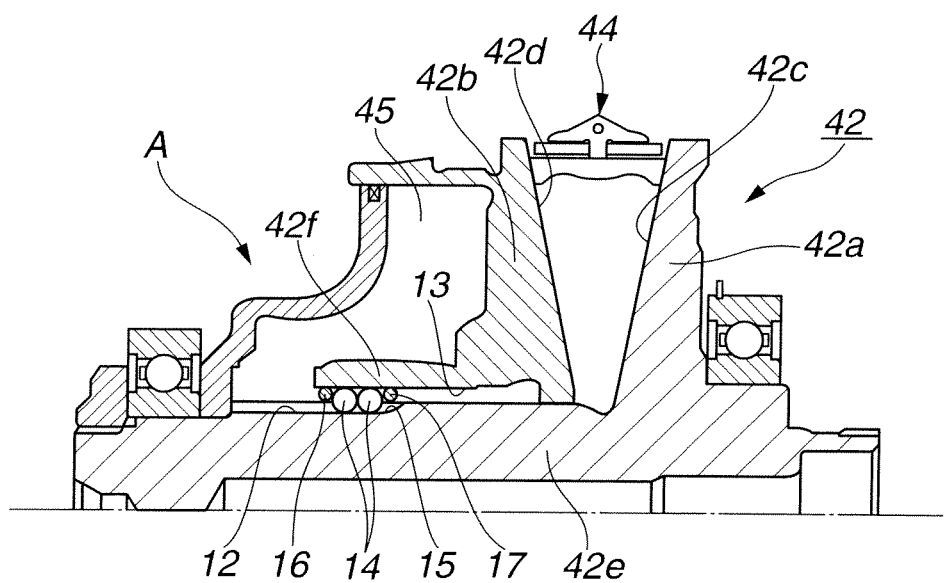
FIG. 3 is a sectional view of the highest transmission ratio lock mechanism used in the primary pulley of the belt-drive continuously variable transmission according to the first embodiment of the present invention, showing an operation of locking a primary moveable sheave in a position where a highest transmission ratio is attained.
Figure 4:
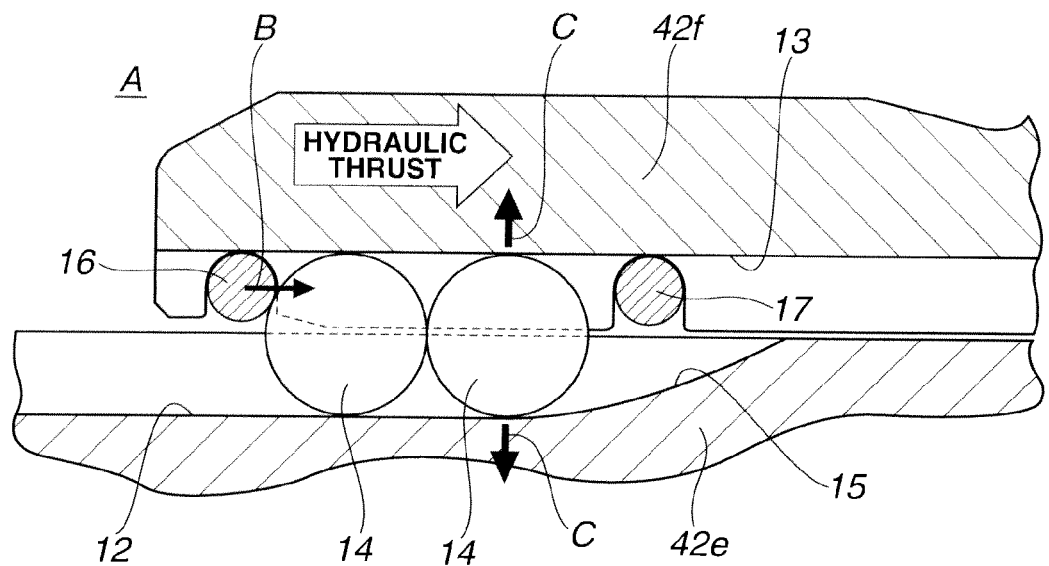
FIG. 4 is an enlarged sectional view of an essential part of the highest transmission ratio lock mechanism as shown in FIG. 3.

FIG. 2 to FIG. 6 show details of highest transmission ratio lock mechanism A used in primary pulley 42 of the belt-drive continuously variable transmission according to the first embodiment. Referring to FIG. 2 to FIG. 4, the construction of highest transmission ratio lock mechanism A will be explained hereinafter.

As shown in FIG. 2 to FIG. 6, highest transmission ratio lock mechanism A includes fixed side axial groove 12, moveable side axial groove 13, balls (i.e., intervening member) 14, 14, cut-raised arcuate groove (i.e., axial tapered groove) 15, lock snap ring (i.e., intervening member displacement limiting member) 16, and unlock snap ring (i.e., intervening member displacement limiting member) 17.

Fixed side axial groove 12 is formed in a suitable position on an outer circumferential surface of primary fixed sheave shaft 42e (for instance, in one to three positions thereon). Fixed side axial groove 12 is a groove having a semi-circular shape in section, and extends in an axial direction of primary fixed sheave shaft 42e.

Moveable side axial groove 13 is formed on an inner radial side of primary moveable sheave sleeve 42f. Specifically, moveable side axial groove 13 is formed in a suitable position on an inner circumferential surface of primary moveable sheave sleeve 42f which corresponds to the position of fixed side axial groove 12. That is, moveable side axial groove 13 is opposed to fixed side axial groove 12 in a radial direction of primary moveable sheave 42b. Moveable side axial groove 13 is a groove having a semi-circular shape in section, and extends in an axial direction of primary moveable sheave sleeve 42f in a parallel relation to fixed side axial groove 12.

Balls 14, 14 are disposed in a cylindrical space defined between fixed side axial groove 12 and moveable side axial groove 13 which are located opposed to each other. Respective balls 14, 14 are provided as an intervening member that serves to reduce slide resistance that is caused when primary moveable sheave sleeve 42f makes an axial slide motion in a transmission range from a low transmission ratio to a high transmission ratio.

Cut-raised arcuate groove 15 has an arcuate shape in section, and is formed as a part of fixed side axial groove 12 (i.e., as one end portion of fixed side axial groove 12) which is disposed corresponding to a highest transmission ratio range. Specifically, cut-raised arcuate groove 15 is a tapered groove that remains in a terminal position where a cutting and grooving operation for forming fixed side axial groove 12 with a circular grooving cutter is ended. Cut-raised arcuate groove 15 extends in the axial direction of primary fixed sheave shaft 42e, and is formed such that a depth thereof is gradually reduced toward a side of primary sheave surface 42c of primary fixed sheave 42a. Cut-raised arcuate groove 15 serves as an axial tapered groove that is formed such that a depth defined between fixed side axial groove 12 and moveable side axial groove 13 is gradually reduced toward a side of the highest transmission ratio.

Lock snap ring 16 is an intervening member displacement limiting member disposed in a ring groove formed in an end portion of moveable side axial groove 13. As shown in FIG. 4, when primary moveable sheave sleeve 42f is urged to move toward a lock position in which primary moveable sheave sleeve 42f is to be locked in an axial position corresponding to the highest transmission ratio, lock snap ring 16 having a circular section serves to input engagement force B produced by a hydraulic thrust acting on primary moveable sheave 42b, to balls 14, 14. In this embodiment, the engagement force B acts in a same direction as that of the hydraulic thrust. The term "hydraulic thrust" means a force that is obtained by multiplying primary pressure Ppri to attain the highest transmission ratio and a pressure applying area of primary moveable sheave 42b to which primary pressure Ppri is applied (see FIG. 3).

Figure 5:
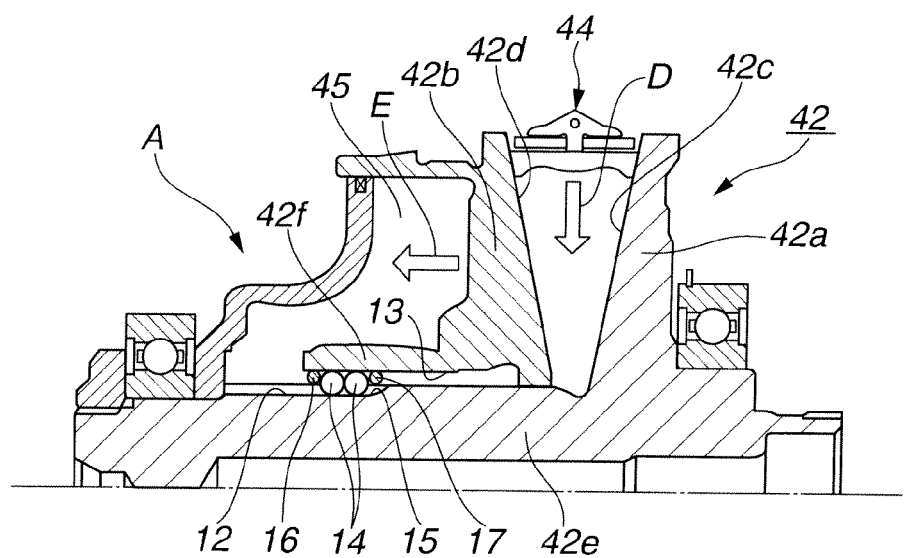
FIG. 5 is a sectional view of the highest transmission ratio lock mechanism used in the primary pulley of the belt-drive continuously variable transmission according to the first embodiment of the present invention, showing an operation of releasing the primary moveable sheave from the position where the highest transmission ratio is attained.
Figure 6:
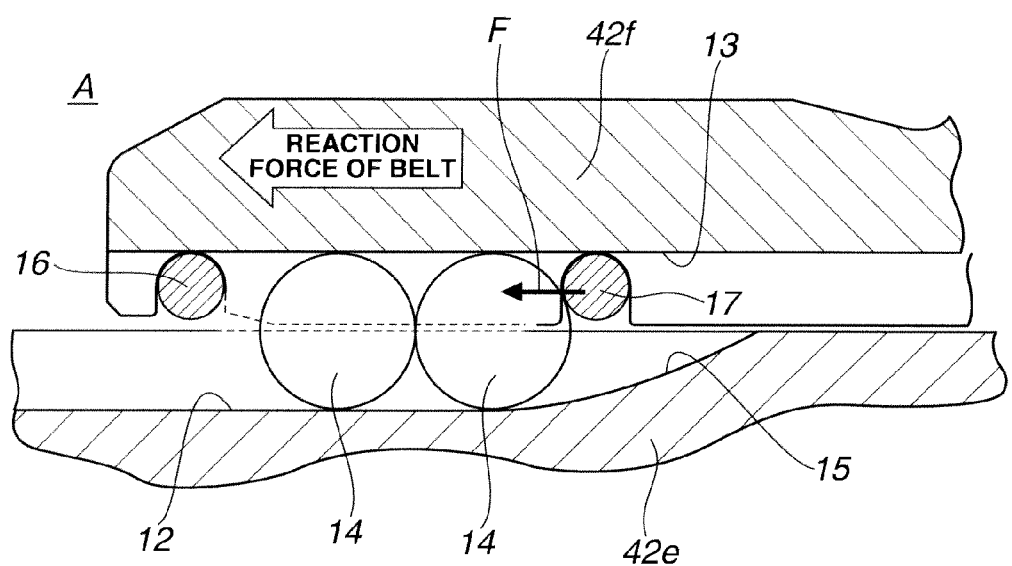
FIG. 6 is an enlarged sectional view of an essential part of the highest transmission ratio lock mechanism as shown in FIG. 5.

Unlock snap ring 17 is an intervening member displacement limiting member disposed in a ring groove formed in a middle portion of moveable side axial groove 13 which is spaced and distant from lock snap ring 16 in the axial direction of primary moveable sheave sleeve 42f. Lock snap ring 16 and unlock snap ring 17 are arranged to limit and allow a degree of freedom of displacement of balls 14, 14 relative to primary fixed sheave shaft 42e or primary moveable sheave sleeve 42f along fixed side axial groove 12 or moveable side axial groove 13 to a slight extent. That is, lock snap ring 16 and unlock snap ring 17 are arranged with an axial limit distance therebetween such that balls 14, 14 are disposed between lock snap ring 16 and unlock snap ring 17 with an axial clearance between balls 14, 14 and the snap rings 16, 17 opposed to respective balls 14, 14. The axial limit distance is set such that a predetermined amount of displacement of balls 14, 14 in the axial direction of primary pulley 42 can be ensured. As shown in FIG. 6, when primary moveable sheave sleeve 42f of primary moveable sheave 42b is urged to move apart from the lock position corresponding to the highest transmission ratio, unlock snap ring 17 having a circular section serves to input disengagement force F to balls 14, 14 which is produced by a belt reaction force that acts on primary moveable sheave 42b. In this embodiment, the disengagement force F acts in a same direction as that of the belt reaction force. The term "belt reaction force" means force E as shown in FIG. 5, which is exerted on primary moveable sheave 42b by belt 44 when belt 44 is displaced in a direction as indicated by arrow D so as to reduce a contact radius thereof with respect to primary pulley 42 as secondary pressure Psec is increased upon shifting from the highest transmission ratio toward a side of a low transmission ratio.

Figure 7:
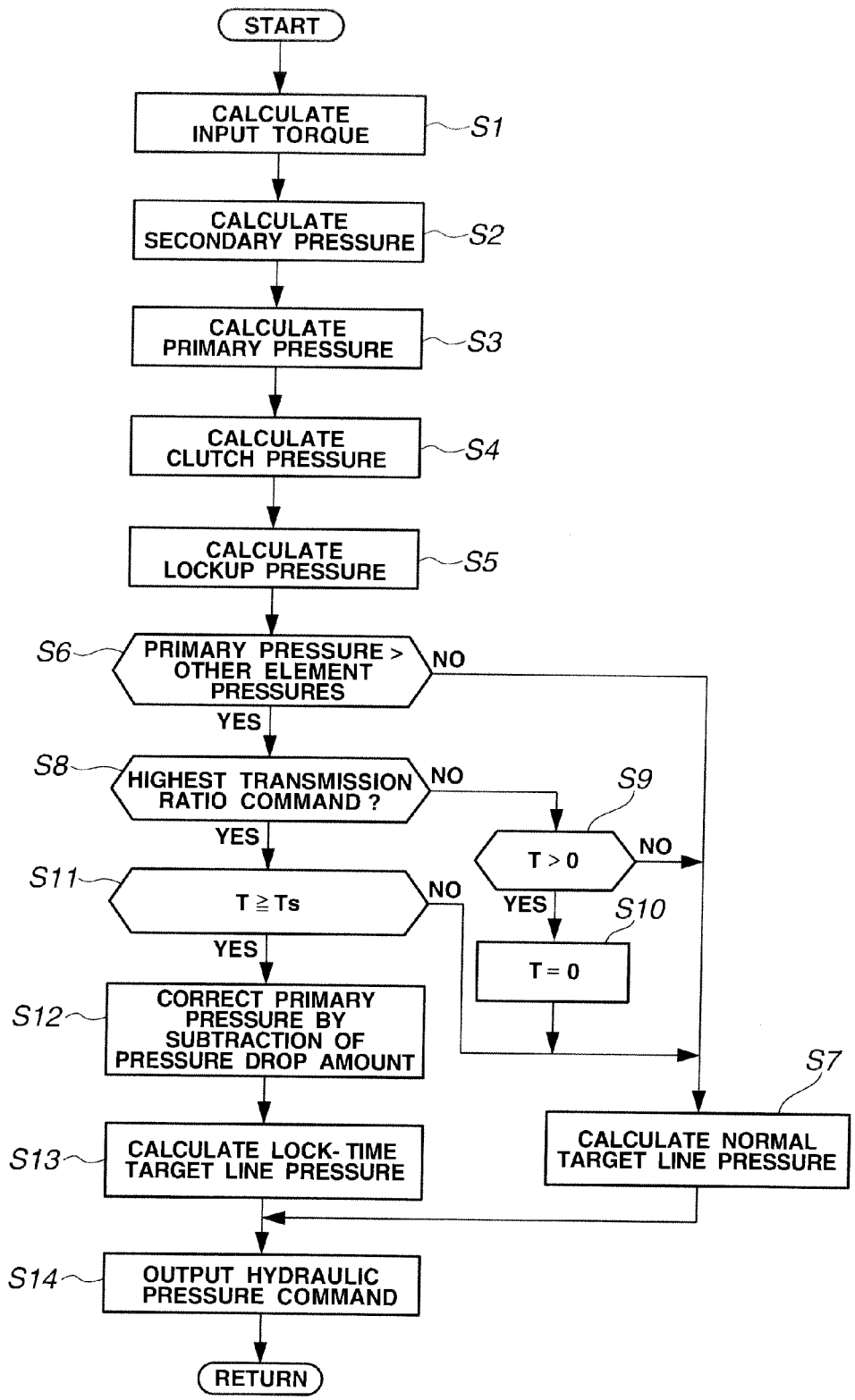
FIG. 7 is a flow chart showing a logic flow of unit element pressure control that is executed by a CVT control unit of the belt-drive continuously variable transmission according to the first embodiment of the present invention.

FIG. 7 shows a logic flow of unit element pressure control that is executed by CVTCU 8 of the belt-drive continuously variable transmission according to the first embodiment. Referring to FIG. 7, a routine of the unit element pressure control will be explained hereinafter.

As shown in FIG. 7, the logic flow starts, and goes to step S1 in which input torque Tin to be inputted to the belt-drive continuously variable transmission is calculated on the basis of information such as engine speed, accelerator opening, etc. The logic flow then goes to step S2.

In step S2, subsequent to the calculation of input torque Tin in step S1, secondary pressure Psec to be applied to secondary pulley hydraulic pressure chamber 46 is calculated so as to attain a target transmission ratio which is determined in accordance with transmission input speed, accelerator opening, etc., by input torque Tin. The logic flow then goes to step S3.

In step S3, subsequent to the calculation of secondary pressure Psec in step S2, primary pressure Ppri to be applied to primary pulley hydraulic pressure chamber 45 is calculated so as to attain the target transmission ratio which is determined in accordance with transmission input speed, accelerator opening, etc., by input torque Tin. The logic flow then goes to step S4.

In step S4, subsequent to the calculation of primary pressure Ppri in step S3, clutch pressure Pc to be applied to forward clutch 31 or reverse brake 32 is calculated on the basis of input torque Tin calculated in step S1 such that there occurs no slippage of forward clutch 31 or reverse brake 32 due to the input torque Tin calculated. The logic flow then goes to step S5.

In step S5, subsequent to the calculation of clutch pressure Pc in step S4, lockup pressure PLU to be applied to lockup clutch 20 is calculated on the basis of input torque Tin calculated in step S1 such that there occurs no slippage of lockup clutch 20 due to the input torque Tin calculated. The logic flow then goes to step S6.

In step S6, subsequent to the calculation of lockup pressure PLU in step S5, it is judged whether or not the primary pressure Ppri calculated exceeds other element pressures (i.e., secondary pressure Psec, clutch pressure Pc and lockup pressure PLU). The term "element pressures" means necessary hydraulic pressures in respective hydraulic elements that are used in a unit of the belt-drive continuously variable transmission. When the answer in step S6 is YES, indicating that the primary pressure Ppri calculated is larger than the other element pressures, the logic flow goes to step S8. When the answer in step S6 is NO, indicating that the primary pressure Ppri calculated is not larger than the other element pressures, the logic flow goes to step S7 as explained later.

In step S8, subsequent to the judgment that the primary pressure Ppri calculated is larger than the other element pressures in step S6, it is judged whether or not a transmission ratio command to be outputted is a highest transmission ratio command. When the answer in step S8 is YES, indicating that the transmission ratio command to be outputted is the highest transmission ratio command, the logic flow goes to step S11. When the answer in step S8 is NO, indicating that the transmission ratio command to be outputted is not the highest transmission ratio command (i.e., other transmission ratio command), the logic flow goes to step S9.

In step S9, subsequent to the judgment that the transmission ratio command to be outputted is not the highest transmission ratio command in step S8, it is judged whether or not highest transmission ratio continuing timer value T is larger than 0. When the answer in step S9 is YES, indicative of T>0, the logic flow goes to step S10. When the answer in step S9 is NO, indicative of T=0, the logic flow goes to step S7.

In step S10, subsequent to the judgment indicative of T>0, the highest transmission ratio continuing timer value T is reset to 0. The logic flow then goes to step S7.

In step S11, subsequent to the judgment that the transmission ratio command to be outputted is the highest transmission ratio command in step S8, the highest transmission ratio continuing timer value T is increased every time the judgment that the transmission ratio command to be outputted is the highest transmission ratio command is made, and it is judged whether or not the highest transmission ratio continuing timer value T increased is not smaller than timer value Ts preset in order to check that primary moveable sheave 42b is held in the lock position corresponding to the highest transmission ratio. When the answer in step S11 is YES, indicative of T≥Ts, the logic flow goes to step S12. When the answer in step S11 is NO, indicative of T<Ts, the logic flow goes to step S7.

In step S7, subsequent to the judgment that the primary pressure Ppri calculated is not larger than the other element pressures in step S6, the judgment indicative of T=0 in step S9, the reset of the highest transmission ratio continuing timer value T, or the judgment indicative of T<Ts, normal target line pressure PL* is calculated by selecting a maximum hydraulic pressure from all the element pressures (i.e., secondary pressure Psec, primary pressure Ppri, clutch pressure Pc and lockup pressure PLU) calculated in step S2 to step S5. The logic flow then goes to step S14.

In step S12, subsequent to the judgment indicative of T≥Ts in step S11, corrected primary pressure Ppri' is calculated by subtracting primary pressure drop amount ΔPpri from the primary pressure Ppri calculated in step S3. Primary pressure drop amount ΔPpri is an amount of drop of primary pressure Ppri which is allowed on the basis of a locking force upon locking at the highest transmission ratio. In order to carry out calculation of corrected primary pressure Ppri', a hydraulic pressure drop amount that is dropped per one control cycle is previously determined. Subsequent to the judgment indicative of T≥Ts, the hydraulic pressure is allowed to gradually and slowly drop from the primary pressure Ppri calculated in step S3 and finally reach the corrected primary pressure Ppri'. The logic flow then goes to step S13.

In step S13, subsequent to the calculation of corrected primary pressure Ppri' in step S12, lock-time target line pressure (i.e., target line pressure upon locking) PL* is calculated by selecting a maximum hydraulic pressure from the secondary pressure Psec calculated in step S2, the corrected primary pressure Ppri' calculated in step S12, the clutch pressure Pc calculated in step S4, and the lockup pressure PLU calculated in step S5. The logic flow then goes to step S14.

In step S14, subsequent to the calculation of normal target line pressure PL* in step S7 or the calculation of lock-time target line pressure PL* in step S13, a line pressure command to obtain the target line pressure PL* calculated in step S7 or the target line pressure PL* calculated in step S13 is outputted, and a hydraulic pressure command to obtain all the calculated element pressures (i.e., secondary pressure Psec, primary pressure Ppri, clutch pressure Pc and lockup pressure PLU) is outputted. The logic flow then goes to return.

Next, an operation of the belt-drive continuously variable transmission according to the first embodiment will be explained. The operation includes "a locking operation of the highest transmission ratio lock mechanism A", "a unlocking operation of the highest transmission ratio lock mechanism A", "a unit element pressure control operation" and "a fuel economy enhancing operation by combination of highest transmission ratio lock and hydraulic pressure control".

[Locking Operation of Highest Transmission Ratio Lock Mechanism A]

When primary moveable sheave 42b in an unlock condition is moved to and locked in the axial position corresponding to the highest transmission ratio (hereinafter referred to also as a highest transmission ratio position), lockability (fixability) to smoothly shift primary moveable sheave 42b to a lock condition is required. Referring to FIG. 2 to FIG. 4, the locking operation of the highest transmission ratio lock mechanism A which is capable of realizing the above lockability is explained hereinafter.

Balls 14, 14 each serving as the intervening member disposed between primary fixed sheave shaft 42e and primary moveable sheave sleeve 42f are disposed between lock snap ring 16 and unlock snap ring 17 arranged with the axial limit distance therebetween as explained above. With this arrangement, when primary moveable sheave sleeve 42f is in an axial position relative to primary fixed sheave shaft 42e which corresponds to a lowest transmission ratio (hereinafter referred to as a lowest transmission ratio position) as shown in FIG. 2, the predetermined amount of displacement of balls 14, 14 in the axial direction of primary pulley 42 (i.e., movement of balls 14, 14 in a left-and-right direction in FIG. 2) can be ensured within the axial limit distance. However, displacement of balls 14, 14 in the axial direction of primary pulley 42 beyond the axial limit distance is restrained by lock snap ring 16 and unlock snap ring 17.

Accordingly, for instance, during a shift stroke in which primary moveable sheave sleeve 42f of primary moveable sheave 42b is moved from the lowest transmission ratio position as shown in FIG. 2 toward the highest transmission ratio position as the lock position as shown in FIG. 3, primary pressure Ppri having a high pressure value is introduced into primary pulley hydraulic pressure chamber 45 to thereby urge primary moveable sheave 42b by a hydraulic thrust. At this time, an amount of displacement of balls 14, 14 with respect to primary moveable sheave 42b is limited by lock snap ring 16 and unlock snap ring 17, and therefore, balls 14, 14 are allowed to move along fixed side axial groove 12 and moveable side axial groove 13 in a rightward direction in FIG. 2.

When primary moveable sheave 42b is urged to the highest transmission ratio position together with balls 14, 14 as shown in FIG. 3, balls 14, 14 are engaged in cut-raised arcuate groove 15 having the gradually reduced depth. At this time, as shown in FIG. 4, engagement force B produced by the hydraulic thrust that acts on primary moveable sheave 42b is inputted to balls 14, 14 through lock snap ring 16. Balls 14, 14 thus undergo the engagement force B in the same direction as the hydraulic thrust, and are pushed into cut-raised arcuate groove 15. As shown in FIG. 4, force C then acts on opposed circumferential surfaces of primary moveable sheave sleeve 42f and primary fixed sheave shaft 42e through ball 14 on the side of cut-raised arcuate groove 15 such that a radial clearance between an inner circumferential surface of primary moveable sheave sleeve 42f and an outer circumferential surface of primary fixed sheave shaft 42e is expanded. As the hydraulic thrust is increased, the force C that presses primary fixed sheave shaft 42e and primary moveable sheave sleeve 42f through ball 14 on the side of cut-raised arcuate groove 15 becomes larger to thereby increase a frictional resistance generated on mutual contact surfaces of ball 14 on the side of cut-raised arcuate groove 15 and each of primary fixed sheave shaft 42e and primary moveable sheave sleeve 42f.

Ball 14 on the side of cut-raised arcuate groove 15 which undergoes the increased frictional resistance by wedge effect serves as a lock member, so that primary moveable sheave 42b is locked or fixed to the highest transmission ratio position. Meanwhile, each of balls 14, 14 which is used as the lock member for locking primary moveable sheave 42b in the axial position relative to primary fixed sheave shaft 42e is an existing component for reducing slide resistance that is generated when primary moveable sheave sleeve 42f slides in the axial direction in a transmission range from a low transmission ratio to a high transmission ratio.

As explained above, in the belt-drive continuously variable transmission according to the first embodiment, the highest transmission ratio lock mechanism A is constructed such that primary moveable sheave 42b is locked in the highest transmission ratio position by utilizing the hydraulic thrust that acts on primary moveable sheave 42b and balls 14, 14 each being the existing component. With the provision of the highest transmission ratio lock mechanism A, it is possible to attain a function of smoothly locking primary moveable sheave 42b in the highest transmission ratio position without causing an increase in cost.

[Unlock Operation of Highest Transmission Ratio Lock Mechanism A]

When primary moveable sheave 42b is unlocked and released from the highest transmission ratio position, unlockability to smoothly shift primary moveable sheave 42b to an unlock condition is required. Referring to FIG. 5 and FIG. 6, an unlock operation of the highest transmission ratio lock mechanism A will be explained hereinafter.

When a shift command to shift to a low-side transmission ratio as a target transmission ratio is outputted under a condition that primary moveable sheave 42b is locked in the highest transmission ratio position, shift hydraulic pressure control to reduce primary pressure Ppri and increase secondary pressure Psec is executed. Under the shift hydraulic pressure control, secondary pressure Psec is increased to pull belt 44 on the side of secondary pulley 43 in order to suppress slippage of belt 44 on the side of primary pulley 42. As secondary pressure Psec is increased, belt 44 is downwardly urged on the side of primary pulley 42 such that a contact radius of belt 44 is reduced as indicated by arrow D in FIG. 5. Reaction force of belt 44 downwardly urged acts on primary moveable sheave 42b in the axial direction (i.e., in the leftward direction in FIG. 5) as indicated arrow E in FIG. 5, so that primary moveable sheave 42b is urged to slightly move toward a side of the low transmission ratio by the reaction force of belt 44.

When unlock snap ring 17 is brought into contact with ball 14 on the side of cut-raised arcuate groove 15 by slight displacement of primary moveable sheave 42b, disengagement force F produced by the reaction force of belt 44 which acts on primary moveable sheave 42b in a same direction as that of the reaction force of belt 44 is inputted to ball 14 on the side of cut-raised arcuate groove 15 through unlock snap ring 17. When the disengagement force F exceeds a locking force produced by the frictional resistance, ball 14 on the side of cut-raised arcuate groove 15 is disengaged from cut-raised arcuate groove 15 so that primary moveable sheave 42b is unlocked and released from the highest transmission ratio position.

As explained above, in the belt-drive continuously variable transmission according to the first embodiment, the highest transmission ratio lock mechanism A is constructed such that primary moveable sheave 42b is unlocked and released from the highest transmission ratio position by utilizing the reaction force of belt 44 which acts on primary moveable sheave 42b and balls 14, 14 each being the existing component. With the provision of the highest transmission ratio lock mechanism A, it is possible to attain a function of smoothly unlocking and releasing primary moveable sheave 42b from the highest transmission ratio position without causing an increase in cost.

[Unit Element Pressure Control Operation]

The aim of providing the belt-drive continuously variable transmission with the highest transmission ratio lock function resides in reducing the line pressure as an original pressure for a unit element pressure by reducing the primary pressure. An operation of controlling the unit element pressure in such a manner will be explained hereinafter by referring to FIG. 7.

In a case where the transmission ratio is lower than 1 and primary pressure Ppri is equal to or lower than other element pressures (i.e., secondary pressure Psec, clutch pressure Pc and lockup pressure PLU), the logic flow proceeding from step S1 through step S2, step S3, step S4, step S5, step S6, step S7 to step S14 as shown in FIG. 7 is repeatedly executed.

In a case where primary pressure Ppri exceeds the other element pressures but the highest transmission ratio command is not outputted, the logic flow proceeding from step S1 through step S2, step S3, step S4, step S5, step S6, step S8, step S9, step S7 to step S14 as shown in FIG. 7 is repeatedly executed.

In a case where primary pressure Ppri exceeds the other element pressures and the highest transmission ratio command is outputted but the condition of time is not satisfied, the logic flow proceeding from step S1 through step S2, step S3, step S4, step S5, step S6, step S8, step S11, step S7 to step S14 as shown in FIG. 7 is repeatedly executed.

Even in any of the above cases, normal control of primary pressure Ppri and line pressure PL is carried out in accordance with the judgment that primary moveable sheave 42b is not held in the lock position corresponding to the highest transmission ratio. Specifically, in step S7, normal target line pressure PL* is calculated by selecting the maximum hydraulic pressure from all element pressures (i.e., secondary pressure Psec, primary pressure Ppri, clutch pressure Pc and lockup pressure PLU) calculated in respective steps S2, S3, S4 and S5. In step S14 subsequent to step S7, a primary pressure command to obtain the primary pressure Ppri calculated in step S3 is outputted, and a line pressure command to obtain the normal target line pressure PL* calculated in step S7 is outputted.

On the other hand, in a case where primary pressure Ppri exceeds the other element pressures, the highest transmission ratio command is outputted and the condition of time is satisfied, the logic flow proceeding from step S1 through step S2, step S3, step S4, step S5, step S6, step S8, step S11, step S12, step S13 to step S14 as shown in FIG. 7 is repeatedly executed.

Thus, in a case where the condition of the highest transmission ratio command and the condition of time are satisfied when primary pressure Ppri is the maximum hydraulic pressure among multiple unit element pressures, it is judged that primary moveable sheave 42b is held in the lock position corresponding to the highest transmission ratio. Further, control of reducing primary pressure Ppri to be introduced into primary pulley hydraulic pressure chamber 45 of primary pulley 42 and control of reducing line pressure PL are executed in accordance with the judgment that primary moveable sheave 42b is held in the lock position corresponding to the highest transmission ratio. Specifically, in step S12, corrected primary pressure Ppri' is calculated by subtracting primary pressure drop amount ΔPpri from the primary pressure Ppri calculated in step S3. In the next step S13, lock-time target line pressure PL* is calculated by selecting the maximum hydraulic pressure from the corrected primary pressure Ppri' calculated in step S12 and the other element pressures calculated. In the next step S14, a primary pressure command to obtain the corrected primary pressure Ppri' calculated in step S12 is outputted, and a line pressure command to obtain the target line pressure PL* calculated in step S13 is outputted.

In a case where the transmission ratio command is changed from the highest transmission ratio command to the low-side transmission ratio command during execution of the unit element pressure control to reduce primary pressure Ppri and line pressure PL, the logic flow proceeding from step S1 through step S2, step S3, step S4, step S5, step S6, step S8, step S9, step S10, step S7 to step S14 as shown in FIG. 7 is repeatedly executed. Specifically, in step S10, the highest transmission ratio continuing timer value T is reset to 0, and then return to normal control of primary pressure Ppri and line pressure PL is executed.

[Operation of Enhancing Fuel Economy by Combination of Highest Transmission Ratio Lock and Hydraulic Pressure Control]

Figure 8:
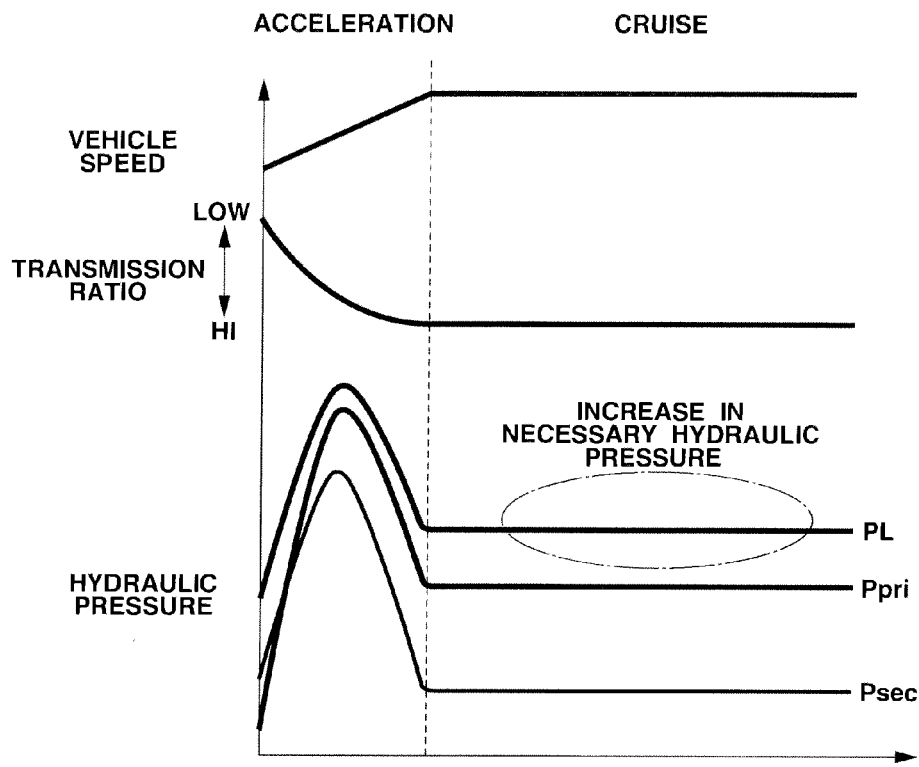
FIG. 8 is a time chart showing characteristics of vehicle speed, transmission ratio, line pressure, primary pressure and secondary pressure when shifting from acceleration to cruising is carried out in an engine vehicle equipped with the conventional belt-drive continuously variable transmission that is provided with no highest transmission ratio lock mechanism.
Figure 9:
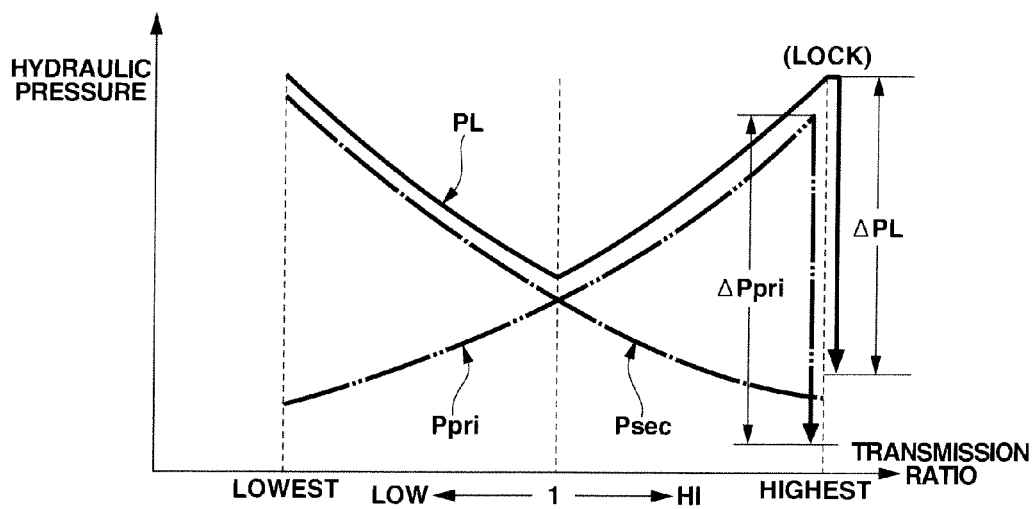
FIG. 9 is a hydraulic characteristic diagram showing an example of a relationship between transmission ratio and hydraulic pressure (line pressure, primary pressure and secondary pressure) in the belt-drive continuously variable transmission according to the first embodiment of the present invention.
Figure 10:
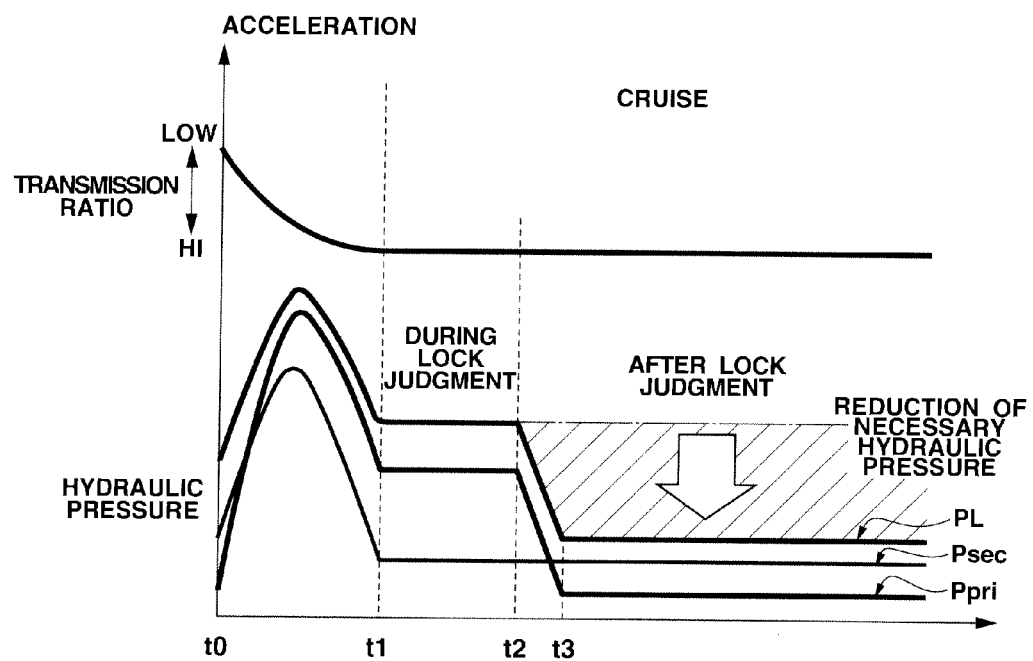
FIG. 10 is a time chart showing characteristics of vehicle speed, transmission ratio, line pressure, primary pressure and secondary pressure when shifting from acceleration to cruising is carried out in the engine vehicle equipped with the belt-drive continuously variable transmission according to the first embodiment of the present invention.

An engine vehicle necessitates fuel economy enhancing ability to enhance fuel economy utilizing the highest transmission ratio lock function. Referring to FIG. 8 to FIG. 10, an operation of enhancing fuel economy by combination of highest transmission ratio lock and hydraulic pressure control will be explained hereinafter.

First, an engine vehicle equipped with a belt-drive continuously variable transmission that is not provided with the highest transmission ratio lock mechanism is explained as a comparative example. In this comparative example, during high speed running, a necessary belt clamping force is ensured by the primary pulley to thereby retain a highest transmission ratio with respect to variation in transmission torque. At this time, a primary pressure supplied to a primary pulley becomes a maximum hydraulic pressure within the unit. Therefore, it is necessary to increase a line pressure that is regulated on the basis of a pump discharge pressure discharged from an oil pump, to at least the primary pressure.

For this reason, during high speed cruising in which the high speed running is maintained for a long period of time, as shown in FIG. 8, a relationship between line pressure Pl, primary pressure Ppri and secondary pressure Psec as indicated by the expression: line pressure PL>primary pressure Ppri>secondary pressure Psec is to be maintained, while keeping the highest transmission ratio. That is, it is necessary to continuously maintain line pressure PL higher than primary pressure Ppri. Thus, an increase in necessary hydraulic pressure is caused during high speed cruising in which the highest transmission ratio is used with high frequency. As a result, torque for driving the oil pump cannot be reduced during the high speed cruising in which the highest transmission ratio is used for a long period of time. In the engine-equipped vehicle that obtains the torque for driving the oil pump from the engine, it is not possible to enhance fuel economy.

In contrast, the belt-drive continuously variable transmission according to the first embodiment includes the highest transmission ratio lock mechanism A serving for locking primary moveable sheave 42b in the highest transmission ratio position, and performs the unit element pressure control in accordance with the flow chart as shown in FIG. 7.

Specifically, as shown in FIG. 9, in the highest transmission ratio position in which primary moveable sheave 42b is to he locked, primary pressure Ppri becomes reduced to a hydraulic pressure obtained by subtracting primary pressure drop amount ΔPpri from normal primary pressure Ppri, and line pressure PL also becomes reduced to a hydraulic pressure obtained by subtracting line pressure drop amount ΔPL from normal target line pressure PL*.

For example, as shown in FIG. 10, acceleration is carried out from time t0 to time t1, and at time t1, the acceleration is shifted to high speed cruising. Subsequently, in a case where it is judged that primary moveable sheave 42b is locked in the highest transmission ratio position at time t2 when a predetermined time has elapsed from time t1, reduction in both primary pressure Ppri and line pressure PL is started at time t2. At time t3, the reduction in both primary pressure Ppri and line pressure PL is completed. During cruising from time t3, a relationship between line pressure Pl, primary pressure Ppri and secondary pressure Psec as indicated by the expression: line pressure PL>secondary pressure Psec>primary pressure Ppri is maintained, while keeping the highest transmission ratio. That is, during high speed cruising in which the high speed running is maintained for a long period of time, it is enough only to ensure the line pressure PL higher than secondary pressure Psec that becomes the maximum hydraulic pressure as primary pressure Ppri is reduced. Therefore, it is possible to reduce a necessary hydraulic pressure at the highest transmission ratio which is used with high frequency during high speed cruising, as indicated by hatching in FIG. 10.

Accordingly, torque for driving oil pump 70 can be reduced during high speed cruising in which the high speed running is maintained for a long period of time. As a result, the engine vehicle which obtains the torque for driving oil pump 70 from engine 1, can serve for enhancing fuel economy.

The present invention is not limited to the first embodiment as described above, and can be modified as follows.

In the first embodiment, highest transmission ratio lock mechanism A is provided on the side of primary pulley 42, in which primary moveable sheave 42b is locked in the highest transmission ratio position. However, in the present invention, a lowest transmission ratio lock mechanism can also be provided on the side of secondary pulley 43, in which secondary moveable sheave 43b is locked in a lowest transmission ratio position corresponding to a lowest transmission ratio. Further, both the highest transmission ratio lock mechanism A and the lowest transmission ratio lock mechanism can be provided such that primary moveable sheave 42b is locked in the highest transmission ratio position, and secondary moveable sheave 43b is locked in the lowest transmission ratio position. Meanwhile, the lowest transmission ratio lock mechanism is useful, for instance, in such an electric-powered vehicle that performs control of maintaining the lowest transmission ratio in a normal running range.

Although in the first embodiment, balls 14, 14 are used as the intervening members, rollers or any other rolling components can be used as the intervening members. That is, any other components can be used as the intervening members as long as the components are disposed between the fixed side axial groove and the moveable side axial groove and serve to reduce slide resistance that is generated when the moveable sheave slides on the fixed sheave in the axial direction in a transmission range between a low transmission ratio and a high transmission ratio.

In the first embodiment, the axial tapered groove (i.e., cut-raised arcuate groove 15) is formed as one end portion of fixed side axial groove 12. However, the axial tapered groove can be formed as one end portion of moveable side axial groove 13, or can be formed as both the one end portion of fixed side axial groove 12 and the one end portion of moveable side axial groove 13. Further, a sectional shape of the axial tapered groove can be a shape other than the arcuate shape used in the first embodiment. That is, the axial tapered groove can be formed at least one of the end of fixed side axial groove 12 and the end of moveable side axial groove 13, and can be arranged corresponding to a highest transmission ratio range or a lowest transmission ratio range such that a depth of cut-raised arcuate groove 15 which is formed between fixed side axial groove 12 and moveable side axial groove 13 is gradually reduced toward a side of a limit at the transmission ratio.

Figure 11:
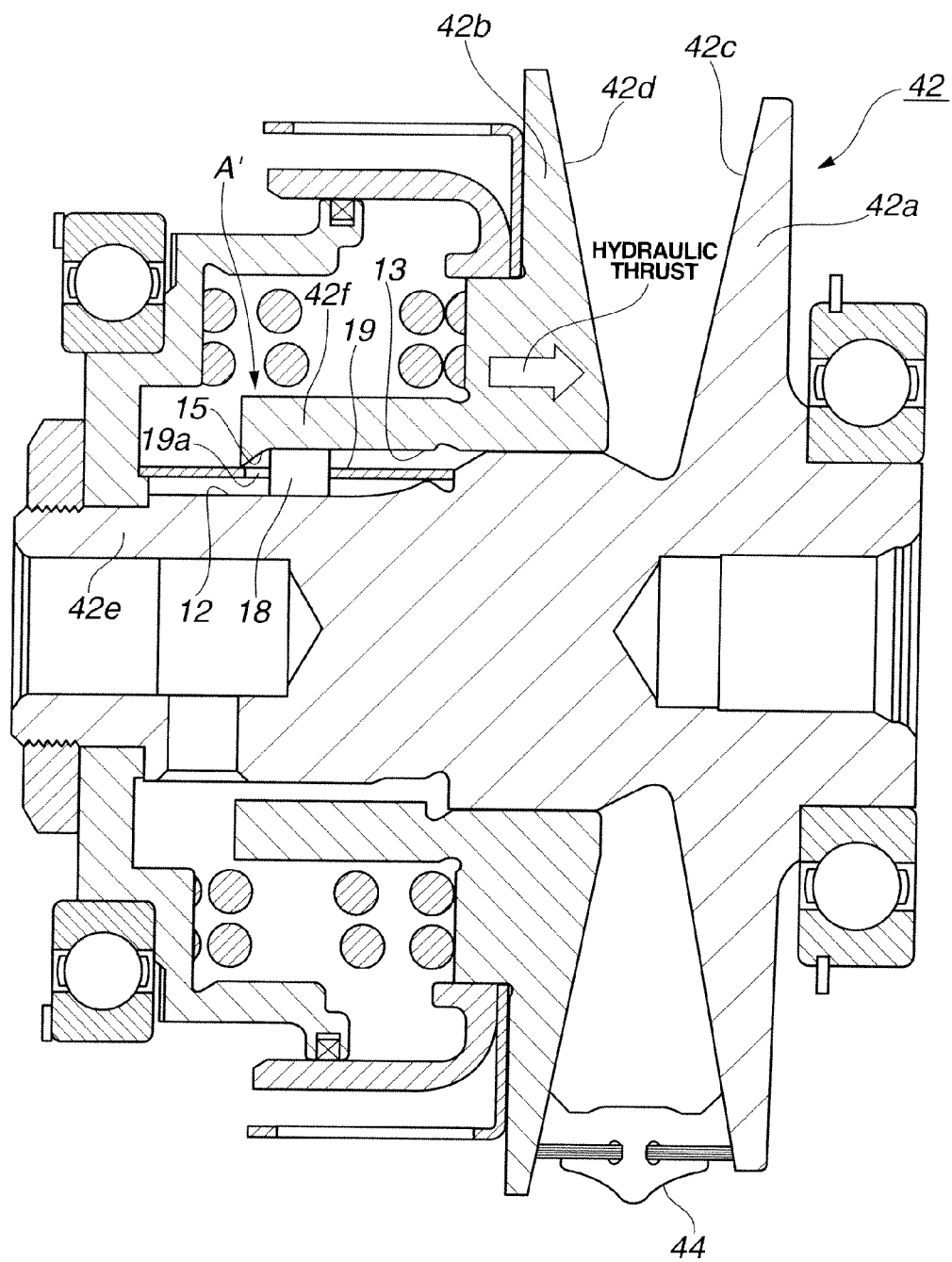
FIG. 11 is a sectional view of a highest transmission ratio lock mechanism used in a primary pulley of a belt-drive continuously variable transmission according to a second embodiment of the present invention, showing a highest transmission ratio condition of the highest transmission ratio lock mechanism.

Referring to FIG. 11, there is shown a belt-drive continuously variable transmission according to a second embodiment of the present invention. The second embodiment differs from the first embodiment in construction of the highest transmission ratio lock mechanism. As shown in FIG. 11, the belt-drive continuously variable transmission according to the second embodiment includes highest transmission ratio lock mechanism A' in which roller 18 serves as the intervening member and roller retainer plate 19 serves as the intervening member displacement limiting member. Roller retainer plate 19 has roller retaining hole 19a is disposed between fixed side axial groove 12 and moveable side axial groove 13, and extends in the axial direction of primary pulley 42. Roller 18 is moveably disposed in roller retaining hole 19a with an axial clearance between both axial ends of roller 18 and peripheral edges of roller retaining hole 19a opposed to the axial ends of roller 18. Roller 18 is retained by roller retainer plate 19 such that an amount of displacement of roller 18 in the axial direction of primary pulley 42 is limited to a predetermined value. Cut-raised arcuate groove 15 is formed such that the depth thereof is gradually reduced toward a side opposite to primary sheave surface 42d of primary moveable sheave 42b. Cut-raised arcuate groove 15 is formed as one end portion of moveable side axial groove 13 which is disposed corresponding to the highest transmission ratio range. Further, cut-raised arcuate groove 15 is formed such that the depth defined between fixed side axial groove 12 and moveable side axial groove 13 is gradually reduced toward the side of the highest transmission ratio. With this arrangement of cut-raised arcuate groove 15, a direction of the engagement force inputted to roller 18 is opposite to a direction of the hydraulic thrust acting on primary moveable sheave 42b, and a direction of the disengagement force inputted to roller 18 is opposite to a direction of the reaction force of belt 44.

The intervening member displacement limiting member is not limited to roller retainer plate 19 used in the second embodiment, and may be any other member that is constructed and arranged as follows. That is, the intervening member displacement limiting member is disposed in a position where the intervening member displacement limiting member can limit a degree of freedom of displacement of the intervening member which is allowed in accordance with a slide movement of primary moveable sheave 42b. Further, when primary moveable sheave sleeve 42f is moved toward the lock position corresponding to the highest transmission ratio, the intervening member displacement limiting member serves to input an engagement force produced by the hydraulic thrust acting on primary moveable sheave 42b to the intervening member. On the other hand, when primary moveable sheave sleeve 42f is moved apart from the lock position corresponding to the highest transmission ratio, the intervening member displacement limiting member serves to input a disengagement force produced by the belt reaction force acting on primary moveable sheave 42b to the intervening member. A direction of the engagement force may be the same as that of the hydraulic thrust as explained in the first embodiment, or in contrast, may be opposite thereto as explained in the second embodiment. Similarly, a direction of the disengagement force may be the same as that of the belt reaction force as explained in the first embodiment, or in contrast, may be opposite thereto as explained in the second embodiment.

In the first and second embodiments, the belt-drive continuously variable transmission of the present invention is applied to an engine vehicle, serving to enhance fuel economy by locking the primary pulley in the highest transmission ratio position. However, the belt-drive continuously variable transmission of the present invention is not limited to the first and second embodiments and can be applied to a drive system of other vehicles such as a hybrid vehicle, an electric vehicle, a fuel cell vehicle, etc. For example, in a case where the belt-drive continuously variable transmission of the present invention is applied to the hybrid vehicle using an engine and a motor as drive sources, both fuel economy and electricity economy can be enhanced. In a case where the belt-drive continuously variable transmission of the present invention is applied to the electric vehicle or the fuel cell vehicle which uses a motor as a drive source, electricity economy can be enhanced.

The belt-drive continuously variable transmission according to the above embodiments can attain the following functions and effects.

(1) The belt-drive continuously variable transmission according to the first and second embodiments includes primary pulley 42, secondary pulley 43, belt 44, fixed side axial groove 12, moveable side axial groove 13, an intervening member (i.e., balls 14, roller 18), an axial tapered groove (i.e., cut-raised arcuate groove 15), and an intervening member displacement limiting member (i.e., lock snap ring 16, unlock snap ring 17, roller retainer plate 19). Primary pulley 42 includes primary fixed sheave 42a having primary fixed sheave shaft 42e and primary moveable sheave 42b having primary moveable sheave sleeve 42f. Primary moveable sheave sleeve 42f is fitted onto primary fixed sheave shaft 42e, and slidably moved relative to primary fixed sheave shaft 42e in the axial direction of primary pulley 42. Secondary pulley 43 includes secondary fixed sheave 43a having secondary fixed sheave shaft 43e and secondary moveable sheave 43b having secondary moveable sheave sleeve 43f. Secondary moveable sheave sleeve 43f is fitted onto secondary fixed sheave shaft 43e, and slidably moved relative to secondary fixed sheave shaft 43e in the axial direction of secondary pulley 43. Belt 44 is wound on primary pulley 42 and secondary pulley 43 to transmit a driving force from a drive source (i.e., engine 1). Fixed side axial groove 12 extends on an outer circumferential surface of primary fixed sheave shaft 42e in the axial direction of primary pulley 42. Moveable side axial groove 13 extends on an inner circumferential surface of primary moveable sheave sleeve 42f in the axial direction of primary pulley 42 so as to be opposed to fixed side axial groove 12. The intervening member is disposed between fixed side axial groove 12 and moveable side axial groove 13. The intervening member serves to reduce slide resistance that is caused when primary moveable sheave sleeve 42f makes an axial slide motion in a transmission range between a low transmission ratio and a high transmission ratio. The axial tapered groove is formed as a part of at least one of fixed side axial groove 12 and moveable side axial groove 13 which is disposed corresponding to a highest transmission ratio range. The axial tapered groove is formed such that a depth defined between fixed side axial groove 12 and moveable side axial groove 13 is gradually reduced toward a side of a highest transmission ratio. The intervening member displacement limiting member is arranged to limit an amount of displacement of the intervening member relative to primary fixed sheave shaft 42e along fixed side axial groove 12 or moveable side axial groove 13. When primary moveable sheave sleeve 42f is moved toward a lock position in which primary moveable sheave sleeve 42f is to be locked in the highest transmission ratio position, the intervening member displacement limiting member serves to input an engagement force produced by a hydraulic thrust acting on primary moveable sheave 42b to the intervening member. When primary moveable sheave sleeve 42f is moved apart from the lock position, the intervening member displacement limiting member serves to input a disengagement force produced by a belt reaction force acting on primary moveable sheave 42b to the intervening member.

With this construction, it is possible to perform a transmission ratio lock function (i.e., highest transmission ratio lock function) by utilizing the force (i.e., the hydraulic thrust and the belt reaction force) exerted on the existing component (i.e., balls 14, roller 18) and primary moveable sheave 42b without causing increase in cost.

(2) The axial tapered groove (i.e., cut-raised arcuate groove 15) has an arcuate shape in section, and is formed as one end portion of the at least one of fixed side axial groove 12 and moveable side axial groove 13. With this construction, the axial tapered groove can be readily formed only by subjecting the at least one of fixed side axial groove 12 and moveable side axial groove 13 to grooving. Thus, it is possible to readily form the axial tapered groove without need of any additional machining.

(3) Fixed side axial groove 12 and moveable side axial groove 13 are parallel to each other. The intervening member displacement limiting member is an element component (i.e., lock snap ring 16, unlock snap ring 17, roller retainer plate 19) which is disposed together with the intervening member (i.e., balls 14, roller 18) with an axial clearance therebetween within a region between fixed side axial groove 12 and moveable side axial groove 13 such that the amount of displacement of the intervening member in the axial direction of primary pulley 24 is limited.

With this construction, it is possible to readily provide the intervening member displacement limiting member by using the element component (for instance, two snap rings 16, 17) which serves as a member that limits a degree of freedom of displacement of the intervening member (i.e., balls 14).

(4) The belt-drive continuously variable transmission according to the first and second embodiments further includes a unit element pressure control means for executing control of reducing primary pressure Ppri to be introduced into primary pulley hydraulic pressure chamber 45 of primary pulley 42 and executing control of reducing line pressure PL in a case where it is judged that primary moveable sheave 42b is held in the lock position corresponding to the highest transmission ratio (see FIG. 7).

With this construction, when primary moveable sheave 42b is locked at the highest transmission ratio which is used with a high frequency during high speed cruising, torque for driving oil pump 70 by engine 1 can be reduced as long as the highest transmission ratio is maintained with reduction of primary pressure Ppri and line pressure PL. Accordingly, it is possible to attain enhancement in fuel economy by continuing reduction of the torque for driving oil pump 70.

This application is based on prior Japanese Patent Application No. 2011-063630 filed on Mar. 23, 2011. The entire contents of the Japanese Patent Application No. 2011-063630 is hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A belt-drive continuously variable transmission comprising:
   a primary pulley comprising a primary fixed sheave having a primary fixed sheave shaft and a primary moveable sheave having a primary moveable sheave sleeve, the primary moveable sheave sleeve being fitted onto the primary fixed sheave shaft and slidably moveable relative to the primary fixed sheave shaft in an axial direction of the primary pulley,
   a secondary pulley comprising a secondary fixed sheave having a secondary fixed sheave shaft and a secondary moveable sheave having a secondary moveable sheave sleeve, the secondary moveable sheave sleeve being fitted onto the secondary fixed sheave shaft and slidably moveable relative to the secondary fixed sheave shaft in an axial direction of the secondary pulley,
   a belt wound on the primary pulley and the secondary pulley to transmit a driving force from a drive source to the primary pulley and the secondary pulley;
   a first fixed side axial groove extending on an outer circumferential surface of the primary fixed sheave shaft in the axial direction of the primary pulley;
   a first moveable side axial groove extending on an inner circumferential surface of the primary moveable sheave sleeve in the axial direction of the primary pulley so as to be opposed to the first fixed side axial groove;
   a first intervening member disposed between the first fixed side axial groove and the first moveable side axial groove, the first intervening member serving to reduce slide resistance that is caused when the primary moveable sheave sleeve makes an axial slide motion in a transmission range between a third transmission ratio and a second transmission ratio,
   a first axial tapered groove formed as a part of at least one of the first fixed side axial groove and the first moveable side axial groove which is disposed corresponding to a first transmission ratio range, the first axial tapered groove being formed such that a depth defined between the first fixed side axial groove and the first moveable side axial groove is gradually reduced toward a side of a first transmission ratio which is higher than the second transmission ratio, and
   a first intervening member displacement limiting member arranged to limit an amount of displacement of the first intervening member relative to the primary fixed sheave shaft or the primary moveable sheave sleeve along the first fixed side axial groove or the first moveable side axial groove,
   wherein when the primary moveable sheave sleeve is moved toward a lock position in which the primary moveable sheave sleeve is to be locked, the lock position corresponding to the first transmission ratio, the first intervening member displacement limiting member is configured to input an engagement force produced by a hydraulic thrust acting on the primary moveable sheave to the first intervening member, the engaging force being exerted on the first intervening member in a same direction as the hydraulic thrust so as to urge the first intervening member into the first axial tapered groove, wherein the first intervening member is urged into the first axial tapered groove so as to be fitted therein,
   wherein when the primary moveable sheave sleeve is moved apart from the lock position thereof, the first intervening member displacement limiting member is configured to input a disengagement force produced by a belt reaction force acting on the primary moveable sheave to the first intervening member, and
   wherein the first intervening member is arranged to move relative to the first intervening member displacement limiting member.

2. The belt-drive continuously variable transmission as claimed in claim 1, wherein the first axial tapered groove has an arcuate shape in section, and is formed as one end portion of the at least one of the first fixed side axial groove and the first moveable side axial groove.

3. The belt-drive continuously variable transmission as claimed in claim 1, wherein the first fixed side axial groove and the first moveable side axial groove are parallel to each other, and the first intervening member displacement limiting member is an element component which is disposed together with the first intervening member with an axial clearance therebetween within a region between the first fixed side axial groove and the first moveable side axial groove such that the amount of displacement of the first intervening member in the axial direction of the primary pulley is limited.

4. The belt drive continuously variable transmission as claimed in claim 1, further comprising a unit element pressure controller configured to:
   reduce a primary pressure to be introduced into a primary pulley hydraulic pressure chamber in the primary pulley, and
   reduce a line pressure in a case where it is judged that the primary moveable sheave sleeve is held in the lock position thereof.

5. The belt drive continuously variable transmission as claimed in claim 1, further comprising:
   a second fixed side axial groove extending on an outer circumferential surface of the secondary fixed sheave shaft in the axial direction of the secondary pulley;
   a second moveable side axial groove extending on an inner circumferential surface of the secondary moveable sheave sleeve in the axial direction of the secondary pulley so as to be opposed to the second fixed side axial groove;
   a second intervening member disposed between the second fixed side axial groove and the second moveable side axial groove, the second intervening member being configured to reduce slide resistance that is caused when the secondary moveable sheave sleeve makes an axial slide motion in a transmission range between a third transmission ratio and a second transmission ratio,
   a second axial tapered groove formed as a part of at least one of the second fixed side axial groove and the second moveable side axial groove which is disposed corresponding to a second transmission ratio range, the second axial tapered groove being formed such that a depth defined between the second fixed side axial groove and the second moveable side axial groove is gradually reduced toward a side of a fourth transmission ratio which is lower than the third transmission ratio, and
   a second intervening member displacement limiting member arranged to limit an amount of displacement of the second intervening member relative to the secondary fixed sheave shaft or the secondary moveable sheave sleeve along the second fixed side axial groove or the second moveable side axial groove,
   wherein when the secondary moveable sheave sleeve is moved toward a lock position in which the secondary moveable sheave sleeve is to be locked, the lock position corresponding to the fourth transmission ratio, the second intervening member displacement limiting member is configured to input an engagement force produced by a hydraulic thrust acting on the secondary moveable sheave to the second intervening member, and wherein when the secondary moveable sheave sleeve is moved apart from the lock position thereof, the second intervening member displacement limiting member is configured to input a disengagement force produced by a belt reaction force acting on the secondary moveable sheave to the second intervening member.

6. The belt-drive continuously variable transmission as claimed in claim 5, wherein the second axial tapered groove has an arcuate shape in section, and is formed as one end portion of the at least one of the second fixed side axial groove and the second moveable side axial groove.

7. The belt-drive continuously variable transmission as claimed in claim 5, wherein the second fixed side axial groove and the second moveable side axial groove are parallel to each other, and the second intervening member displacement limiting member is an element component which is disposed together with the second intervening member with an axial clearance therebetween within a region between the second fixed side axial groove and the second moveable side axial groove such that the amount of displacement of the second intervening member in the axial direction of the secondary pulley is limited.

8. The belt-drive continuously variable transmission as claimed in claim 1, wherein the first intervening member is provided in the form of a ball, and the first intervening member displacement limiting member is provided in the form of a pair of snap rings between which the ball is disposed with an axial clearance therebetween in the axial direction of the primary pulley.

9. The belt-drive continuously variable transmission as claimed in claim 1, wherein the first intervening member is provided in the form of a roller, and the first intervening member displacement limiting member is provided in the form of a roller retainer plate having a roller retaining hole in which the roller is retained such that an amount of displacement of the roller in the axial direction of the primary pulley is limited.

10. The belt-drive continuously variable transmission as claimed in claim 1, wherein the belt is wound on a pair of primary sheave surfaces of the primary fixed sheave and the primary moveable sheave which are opposed to each other to form a V-shaped groove therebetween, and a pair of secondary sheave surfaces of the secondary fixed sheave and the secondary moveable sheave which are opposed to each other to form a V-shaped groove therebetween, and the first axial tapered groove is formed as one end portion of the first fixed side axial groove and tapered toward a side of the primary sheave surface of the primary fixed sheave.

11. The belt-drive continuously variable transmission as claimed in claim 1, wherein the belt is wound on a pair of primary sheave surfaces of the primary fixed sheave and the primary moveable sheave which are opposed to each other to form a V-shaped groove therebetween, and a pair of secondary sheave surfaces of the secondary fixed sheave and the secondary moveable sheave which are opposed to each other to form a V-shaped groove therebetween, and the first axial tapered groove is formed as one end portion of the first moveable side axial groove and tapered toward a side opposite to the primary sheave surface of the primary moveable sheave.

12. A belt-drive continuously variable transmission comprising:
a primary pulley comprising a primary fixed sheave having a primary fixed sheave shaft and a primary moveable sheave having a primary moveable sheave sleeve, the primary moveable sheave sleeve being fitted onto the primary fixed sheave shaft and slidably moveable relative to the primary fixed sheave shaft in an axial direction of the primary pulley,
a secondary pulley comprising a secondary fixed sheave having a secondary fixed sheave shaft and a secondary moveable sheave having a secondary moveable sheave sleeve, the secondary moveable sheave sleeve being fitted onto the secondary fixed sheave shaft and slidably moveable relative to the secondary fixed sheave shaft in an axial direction of the secondary pulley,
a belt wound on the primary pulley and the secondary pulley to transmit a driving force from a drive source to the primary pulley and the secondary pulley;
a lock mechanism configured to lock the primary moveable sheave sleeve relative to the primary fixed sheave shaft in a highest transmission ratio position corresponding to highest transmission ratio, the lock mechanism comprising:
opposed axial grooves extending in the axial direction of the primary pulley in an opposed relation to each other in a radial direction of the primary pulley, the opposed axial grooves being formed on an outer circumferential surface of the primary fixed sheave shaft and an inner circumferential surface of the primary moveable sheave sleeve,
an axial tapered groove formed as a part of at least one of the opposed axial grooves, the axial tapered groove being formed such that the axial tapered groove is disposed in a highest transmission ratio range and a depth thereof is gradually reduced toward a side of the highest transmission ratio when the primary moveable sheave sleeve is placed in the highest transmission ratio position,
a rolling element rollably disposed between the opposed axial grooves; and
a rolling element displacement limiting element which is configured to limit an amount of displacement of the rolling element relative to the primary fixed sheave shaft or the primary moveable sheave sleeve along one of the opposed axial grooves,
wherein the rolling element displacement limiting element is configured to engage the rolling element in the axial tapered groove such that the primary moveable sheave sleeve is locked in the highest transmission ratio position by a hydraulic thrust acting on the primary moveable sheave, the rolling element being urged into the axial tapered groove so as to be fitted therein,
wherein the rolling element displacement limiting element is configured to disengage the rolling element from the axial tapered groove such that the primary moveable sheave sleeve is unlocked and released from the highest transmission ratio position by a belt reaction force acting on the primary moveable sheave, and
wherein the rolling element is arranged to move relative to the rolling element displacement limiting element.

* * * * *